United States Patent [19]

Gutschick et al.

[11] 3,770,889

[45] Nov. 6, 1973

[54] HINGED CHASSIS ARRANGEMENT FOR RECEIVER APPARATUS AND THE LIKE

[75] Inventors: Lester C. Gutschick, Morton Grove; Edwin S. Landow, Arlington Heights, both of Ill.

[73] Assignee: Zenith Radio Corporation, Chicago, Ill.

[22] Filed: Mar. 10, 1972

[21] Appl. No.: 233,625

[52] U.S. Cl. .................................. 178/7.9, 325/352

[51] Int. Cl. .............................................. H04b 1/08

[58] Field of Search .............................. 178/7.8, 7.9; 325/352, 353, 355, 356

[56] References Cited

UNITED STATES PATENTS

| | | | |
|---|---|---|---|
| 3,679,829 | 7/1972 | Hofmeister et al. | 178/7.9 |
| 3,251,939 | 5/1966 | Pestka et al. | 178/7.9 |
| 2,878,375 | 3/1959 | Schachtel | 325/352 |
| 2,185,562 | 1/1940 | Nielsen | 325/352 |

FOREIGN PATENTS OR APPLICATIONS

| | | | |
|---|---|---|---|
| 1,303,393 | 7/1962 | France | 178/7.9 |

*Primary Examiner*—Gareth D. Shaw
*Attorney*—Nicholas A. Camasto et al.

[57] ABSTRACT

A hinged chassis arrangement in a television receiver which is especially adaptable to automated or semi-automated manufacturing and testing techniques. The hinged chassis arrangement utilizes a sub-chassis removably hinged to a principal chassis. During assembly the principal chassis and the sub-chassis are substantially coplanar such that all electrical and mechanical components are mounted from the top into terminal strips extending downwardly through the chassis. After dip-soldering and testing, the sub-chassis is rotated to position upwardly perpendicular to the principal chassis. Component module boards having electrical components mounted thereupon comprising electrical circuits are then affixed to the back of the sub-chassis by female connectors utilizing the extending terminal strips as male connectors.

4 Claims, 5 Drawing Figures

HINGED CHASSIS ARRANGEMENT FOR RECEIVER APPARATUS AND THE LIKE

CROSS REFERENCES TO RELATED APPLICATIONS

The subject invention is related to the hinging mechanism described and claimed in the copending application of Richard L. Pierce and Herbert E. Stafford, Ser. No. 233,520 filed concurrently herewith and assigned to the assignee of the present invention.

BACKGROUND OF THE INVENTION

The present invention relates generally to improvements in television receivers and more particularly to a hinged chassis arrangement providing a more compact television chassis which is easier to manufacture and service. The present invention further relates to a method of assembling a hinged chassis arrangement of the foregoing type.

Conventionally, the chassis of a television receiver comprises a sheet metal structure, several inches high, extending across virtually the entire area comprising the bottom of the television cabinet. Generally speaking, major components such as transformers, rectifiers and the like are mounted on the side of the chassis and relatively small components such as capacitors, resistors and inductors and most of the wiring of the receiver are located on the bottom side of the chassis. This arrangement requires the chassis to be repositioned manually at several stations along the manufacturing line to facilitate assembly and testing; and, as a result, it is not conducive to less expensive, semi-automated manufacturing techniques such as dip-soldering and automated testing procedures.

Furthermore, since chassis space is limited, many of these components are positioned beneath the picture tube or in other difficult-to-reach locations in order to avoid an oversized chassis and cabinet. Such a chassis arrangement, however, requires considerable tooling to match the contour of the chassis to the available space left at the bottom of the cabinet after the cathode-ray tube is mounted therein. With the advent of transistorized television receivers utilizing solid-state devices, heat dissipation is no longer the problem it once was, and the chassis need no longer be confined to the bottom of the television cabinet to provide adequate air circulation. Accordingly, a narrower chassis lying in more than one plane may be provided to utilize the available space more efficiently. The resulting narrower chassis will not require the conventional notch at the front of the chassis to provide clearance for mounting the cathode-ray tube thereby reducing chassis tooling costs.

Moreover, many times the receiver may fail in operation due to a breakdown in some component such as a resistor, capacitor, etc. When this occurs, it may be necessary to pull the entire chassis and picture tube from the cabinet in order to gain access to the wiring and minor components of the receiver. In a receiver of conventional construction this procedure is often difficult and time consuming and may require that the receiver be taken to a service shop, since it may not be conveniently performed in the field.

SUMMARY OF THE INVENTION

Accodingly, it is an object of the present invention to provide a new and improved chassis arrangement which overcomes the disadvantages and deficiencies of prior means.

A further object of the invention is to provide an improved chassis arrangement which is conducive to semi-automated assembly and testing.

A more particular object of the invention is to provide an improved chassis arrangement which is more compact and requires a minimum of tooling.

Another object of the invention is to provide an improved chassis arrangement which is easily serviceable and wherein all components are accessible from the top of the chassis without removing the chassis from the television receiver.

A more specific object of the invention is to provide an improved chassis arrangement wherein plug-in component module boards may be mounted on a rear apron thereof to enhance accessibility and serviceability.

In accordance with the present invention, a chassis arrangement is provided which is compact, inexpensive and conductive to semi-automated manufacture and testing. In a preferred embodiment, the chassis arrangement includes a principal chassis having a planar surface where electrical and mechanical components may be mounted. There is also included a sub-chassis likewise having a flat surface for mounting the electrical and mechanical components. The principal chassis and sub-chassis are removably coupled by a hinge means which allows the sub-chassis to be moved between positions substantially coplanar and substantially perpendicular to the planar surface of the principal chassis. Means are also provided to secure the sub-chassis in the position perpendicular to the planar surface of the principal chassis. The sub-chassis includes terminals for mounting electrical components to the sub-chassis. These terminals are further utilized to mechanically affix and electrically connect component module boards to the sub-chassis. In the preferred embodiment, these terminals extend downwardly through openings in the sub-chassis and act as male connectors for receiving the component module boards having corresponding female connectors.

In accordance with the invention, there is also provided a method of assembling a television chassis or the like. The inventive method comprises the following steps. First, there is provided a principal chassis having a planar surface with terminals affixed thereto for mounting and interconnecting electrical components comprising an electrical circuit. A separate sub-chassis is also provided which lies in a plane substantially coplanar to the principal chassis and is hinged thereto. The sub-chassis, like the principal chassis, has terminals for mounting and interconnecting electrical components. After the electrical components are mounted in the terminals on the principal chassis and the sub-chassis, the sub-chassis is wired to the principal chassis thereby providing an electrical connection between them. The terminals are then dip-soldered to complete the electrical circuit. Subsequently, the sub-chassis is rotated to a position substantially perpendicular to the planar surface of the principal chassis and component module boards having electrical circuits and service controls located thereon are mounted to the rear of the sub-chassis thereby facilitating easy replacement and servicing.

BRIEF DESCRIPTION OF THE DRAWINGS

The features of this invention which are believed to be novel are set forth with particularity in the appended claims. The invention, together with further objects and advantages thereof, may be best understood, however, by reference to the following description taken in conjunction with the accompanying drawings, in which like reference numerals refer to like elements in the several figures and in which:

PREFERRED EMBODIMENT OF THE INVENTION

Figures 1, 2, 2A, 3, 4:
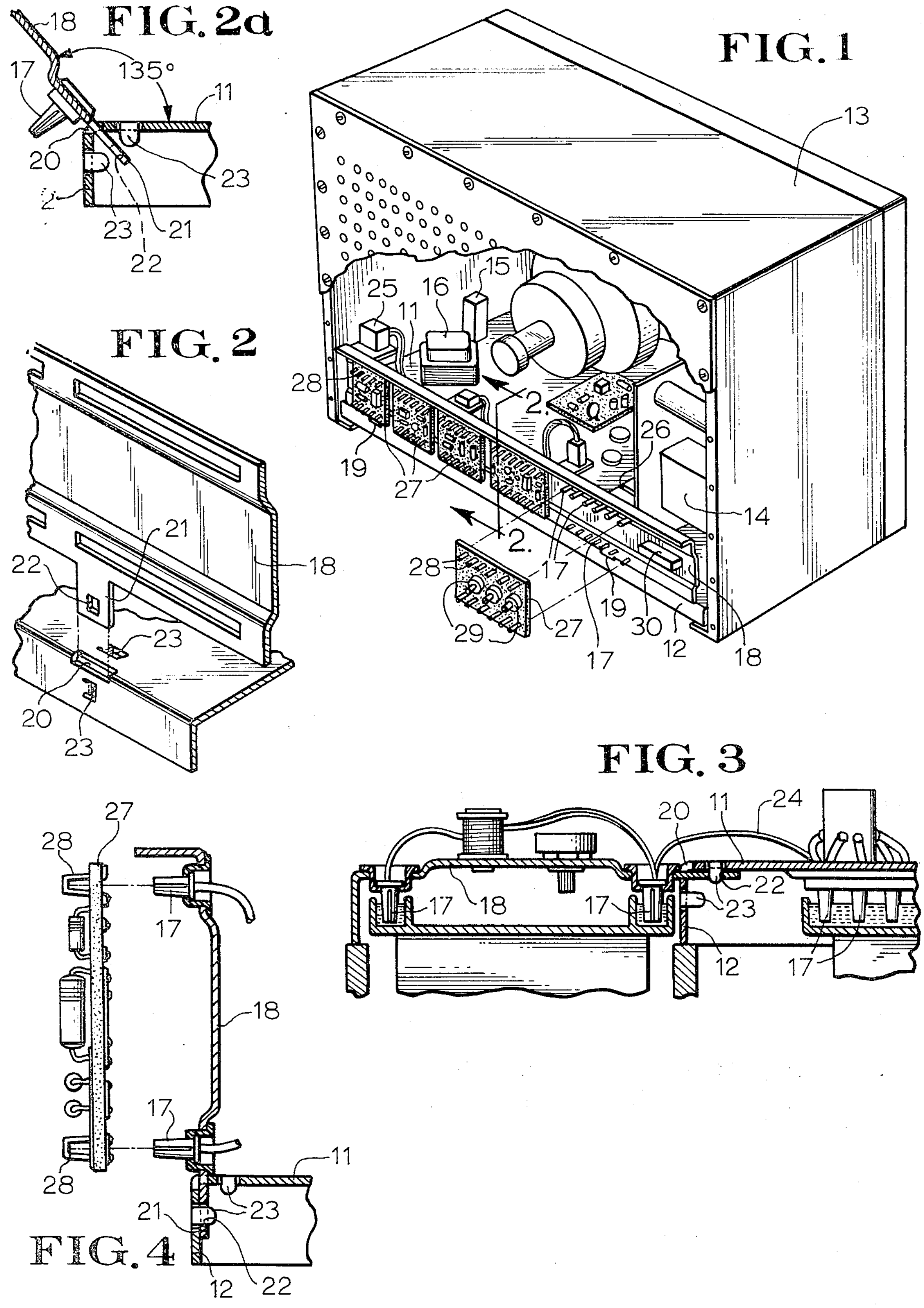
FIG. 1 is a perspective view of a partially assembled television chassis constructed in accordance with the invention.
FIG. 2 is an exploded view of a hinging assembly utilized in a preferred embodiment of the present invention.
FIG. 2*a* is a sectional view of the assembled hinging assembly of FIG. 2.
FIG. 3 is a sectional view of a television chassis taken along lines 2—2 of FIG. 1 as the chassis appears on a semi-automated assembly line.
FIG. 4 is a sectional view of a television chassis taken along lines 2—2 of FIG. 1.

In accordance with the present invention, the color television receiver shown in FIG. 1 incorporates a compact, hinged chassis arrangement conducive to semi-automated manufacturing and testing techniques.

The chassis assembly includes a principal chassis 11 having a substantially planar surface with downward-extending flanges 12 for supporting the principal chassis in a position horizontal to the bottom of the television cabinet 13. The principal chassis 11 is further tooled to provide certain predetermined slots and other openings which are desirable for mounting electrical and mechanical components. These components comprise, for example, the high-voltage system 14, the intermediate-frequency (IF) amplifier module 15, the low-voltage power supply transformer 16 and terminals 17 for mounting other small components associated with these stages. It is a feature of the present invention that no components are mounted on the bottom of the principal chassis 11. Thus, during manufacture there is no need to re-position the chassis on the assembly line in order to mount such components on both the top and the bottom of the chassis as has been heretofore necessary. A separate, substantially flat sub-chassis 18 is also provided. Like the principal chassis 11, there are included terminals 17 extending downwardly through the sub-chassis 18 for mounting small electrical or mechanical components on the top surface of the sub-chassis 18.

The sub-chassis 18 is removably coupled to the principal chassis 11 by means of a hinging mechanism 19 which is the subject of a copending application, Ser. No. 233,520 filed concurrently herewith in the name of Richard L. Pierce and Herbert E. Stafford and assigned to the assignee of the present invention. As shown in greater detail in FIG. 2, hinging mechanism 19 comprises one or more hinge slots 2 disposed along the partial fold between the rear support flange 12 and the planar surface of the principal chassis 11. When the hinge flanges 21 are inserted in the slots 20, the sub-chassis 18 is rotatable between a position substantially coplanar to the planar surface of the principal chassis 11 and a position extending upward and substantially perpendicular thereto.

Small apertures 22 are included on the hinge flanges 21 to engage preformed locking tabs 23 on the principal chassis 11. These preformed tabs 23 which are formed by pressing a tab inwardly from the support flange 12 and the planar surface of the principal chassis 11 prevent removal of sub-chassis 18 when it is in the substantially coplanar or substantially perpendicular positions. As FIG. 2*a* illustrates, the hinge flanges 21 may be inserted or withdrawn from the hinge slots 20 on the principal chassis 11 only when the sub-chassis 18 is positioned at an angle approximately 135° from either the support flange 12 or the planar surface of the principal chassis 11.

During assembly, the hinge flanges 21 of the sub-chassis 18 are inserted into hinge slots 20, and the sub-chassis 18 is rotated to the locked position substantially coplanar with the planar surface of the principal chassis 11. As shown in FIG. 3, the principal chassis 11 together with the coplanar sub-chassis 18 is then placed on an automated or semi-automated assembly line. Since each terminal 17 on the principal chassis 11 and the sub-chassis 18 extends downwardly through slots in the chassis, all of the electrical and mechanical components are manually mounted in the terminals 17 from the top side of the chassis. The sub-chassis 18 is then electrically connected to the principal chassis 11 by wires 24 between terminals 17 on the two chassis or, in the alternative, by plug-in connectors 25.

Once all of the components are mounted and the two chassis are electrically interconnected, the hinged chassis assembly is moved to the next manufacturing station where it is selectively dip-soldered. Since it lies nearly flat in the horizontal plane with all components mounted on top, the chassis assembly may be dip-soldered without removing it from the assembly line.

After dip-soldering, the chassis assembly is moved to a computerized testing station where the exposed terminals 17 extending downwardly through the principal chassis 11 and the sub-chassis 18 are utilized as test points. Once again there is no need to remove the chassis assembly from the assembly line because of the accessibility of the test points to the automated testing station which operates on the underside of the chassis assembly to insure that it satisfies various electrical standards.

After the electrical and mechanical components have been mounted, and the chassis has been wired, soldered and tested, the sub-chassis 18 is rotated to the position upwardly perpendicular to the planar surface of the principal chassis 11 and secured by a latching mechanism 26 (shown in FIG. 1) to provide a more compact chassis as shown in FIG. 1. When the sub-chassis 18 is latched, the portion of the component mounting terminals 17 extending from the substantially flat surface of the sub-chassis 18 may further serve as male connectors for mounting component module boards 27 on the sub-chassis 18 as illustrated in FIG. 4. The component module boards 27, each representing a separate, distinct portion of the color television receiver's electrical circuitry (e.g., the audio stage, the chroma channel, or the sync-AGC stage), are mounted on small individual circuit boards having corresponding female connectors 28. When the component module boards 27 are mounted on the terminals 17 or male connectors of the sub-chassis 18, electrical circuits are completed between the module boards 27 and components mounted on the top of the sub-chassis 18. Since the component module boards 27 are easily accessible when the hinged chassis assembly is mounted in a cabinet with the sub-chassis 18 in the perpendicular position, the service adjustment controls 29 (shown in FIG. 1) may be mounted upon the module boards 27 to facilitate servicing the color television receiver. Small, plastic insulating clips 30 may be placed over exposed terminals 17 or male connectors which are not used in mounting the module boards 27 thereby preventing accidental electrical shock.

Accordingly, the hinged chassis arrangement of the present invention is easily adapted to semi-automated manufacturing and testing concepts. That is, once the chassis arrangement is positioned on the manufacturing assembly line, the whole assembly and testing procedures may be accomplished without repositioning the chassis. This quite obviously reduces the labor cost involved with building a television receiver. It is also possible with this arrangement that a universal sub-chassis may be designed which can be mated with a non-universal principal chassis embodying design considerations unique to the television receiver for which the chassis was designed. Thus, the principal chassis is used for mounting the low-voltage power supply and the high-voltage system which may vary depending on the size of the cathode-ray tube used, and the sub-chassis is used for mounting items which may be standardized for various chassis designs. Consequently, it may be desirable to assemble a quantity of completed sub-chassis and later join them with the desired principal chassis.

Because the sub-chassis is finally positioned perpendicularly to the planar surface of the principal chassis, the front-to-back width of the principal chassis is no longer critical and may be greatly reduced. The expense of tooling a "notch" in the chassis to clear the cathode-ray tube is accordingly eliminated because the principal chassis may now be positioned farther back in the television cabinet.

Furthermore, the ease of serviceability is greatly enhanced because much of the electrical circuitry is mounted on the component module boards which are accessible to the serviceman simply by removing the back of the television cabinet. Time-consuming and difficult removal of the complete chassis from the television cabinet is thereby eliminated.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

We claim:

1. In a television receiver or the like, a chassis arrangement comprising in combination:

a principal chassis having a planar surface including electrical and mechanical components mounted thereon;

a sub-chassis having a flat surface including electrical and mechanical components mounted thereon;

hinge means for removably coupling said sub-chassis to said principal chassis, said hinge means allowing said sub-chassis to be moved between a position substantially coplanar to said planar surface of said principal chassis and a position substantially perpendicular thereto, said hinge means permitting disengagement between said chassis only when said sub-chassis is positioned intermediate said coplanar and perpendicular positions.

2. A chassis arrangement in accordance with claim 1 wherein means are provided for securing said sub-chassis in a position perpendicular to said planar surface of said principal chassis.

3. A chassis arrangement in accordance with claim 1 wherein said sub-chassis includes terminals affixed thereto for mounting said electrical components, said terminals being further utilized to mechanically affix and electrically connect component module boards to said sub-chassis.

4. A chassis arrangement in accordance with claim 3 wherein said terminals extend through openings in said sub-chassis, said terminals further acting as male connectors for affixing component module boards having corresponding female connectors to said sub-chassis.

* * * * *